UNITED STATES PATENT OFFICE.

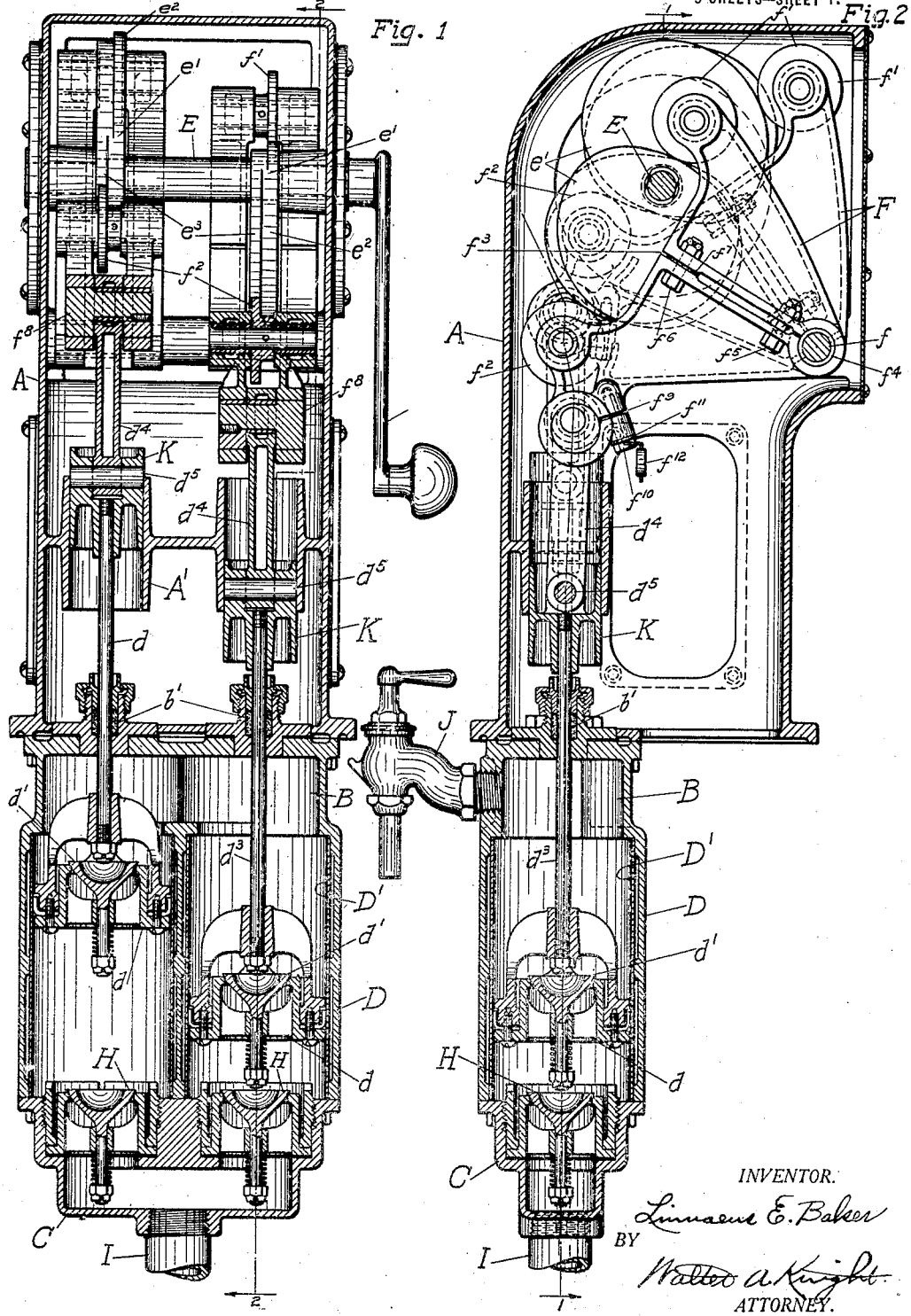

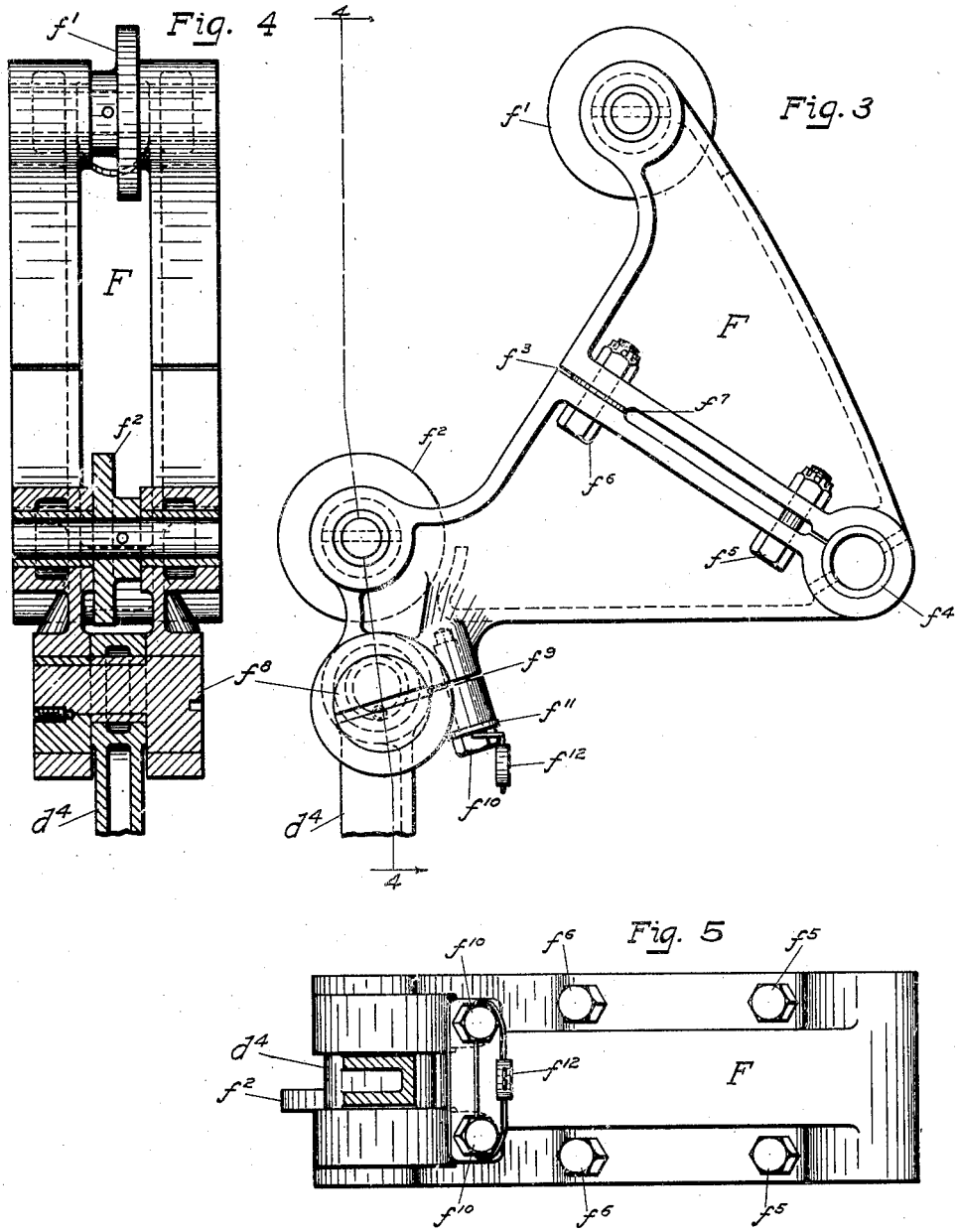

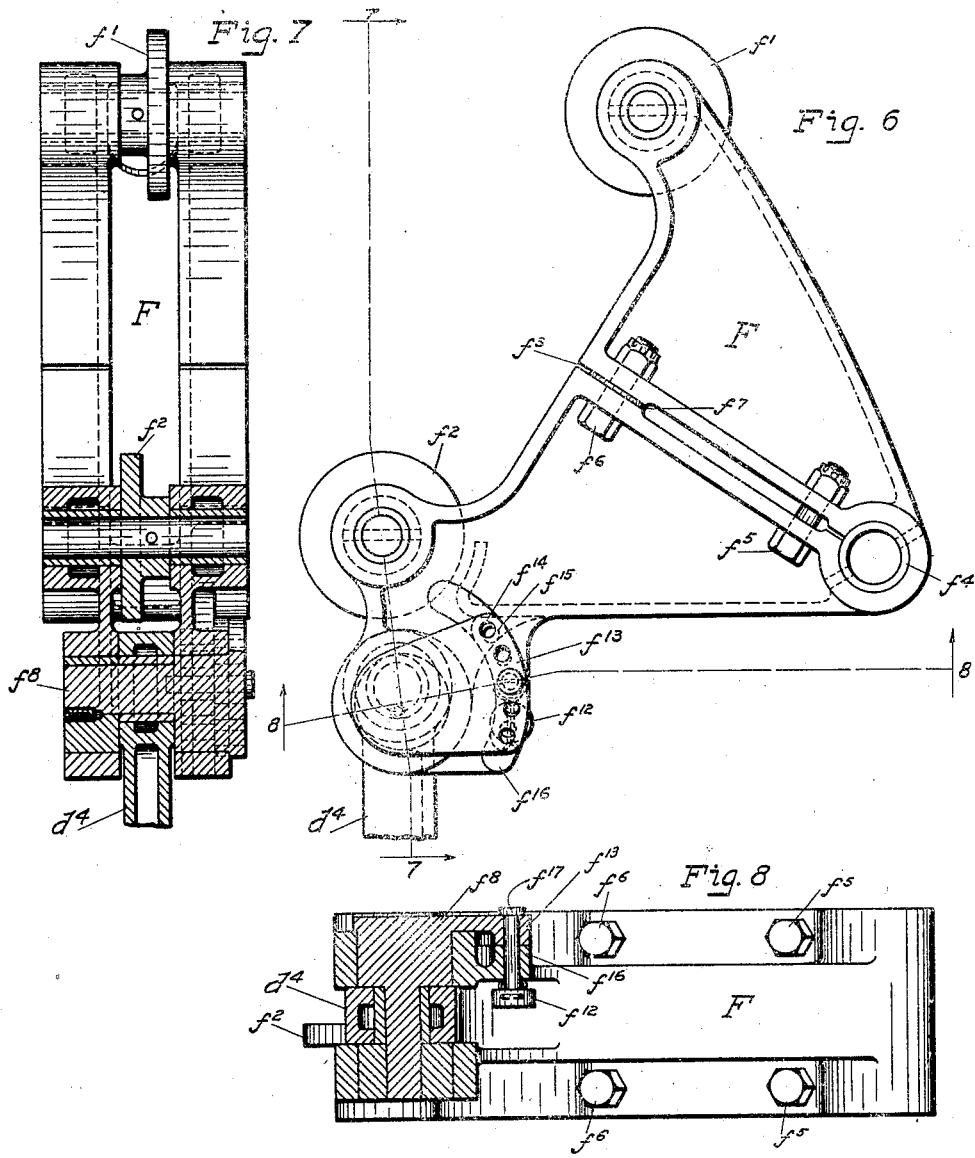

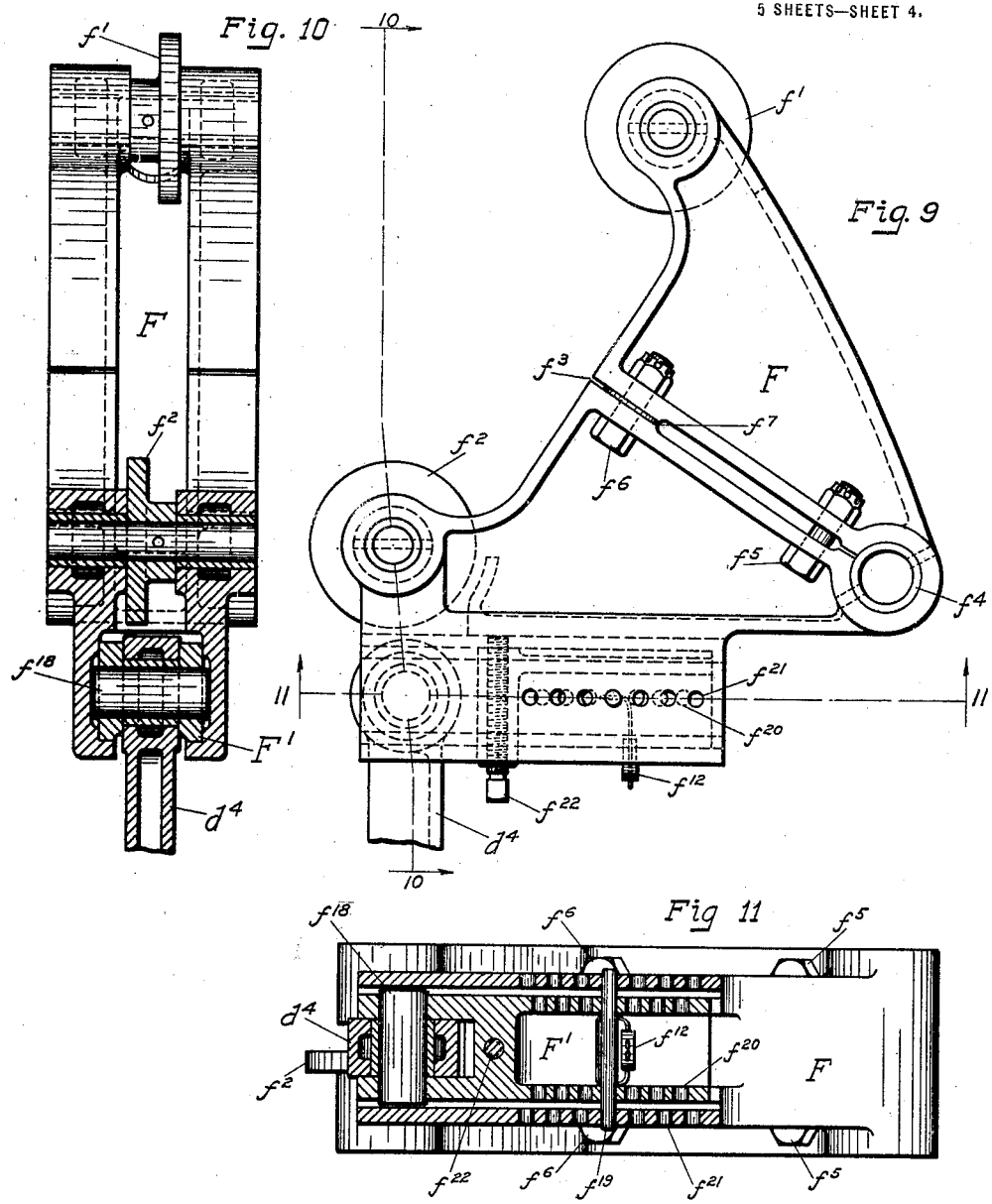

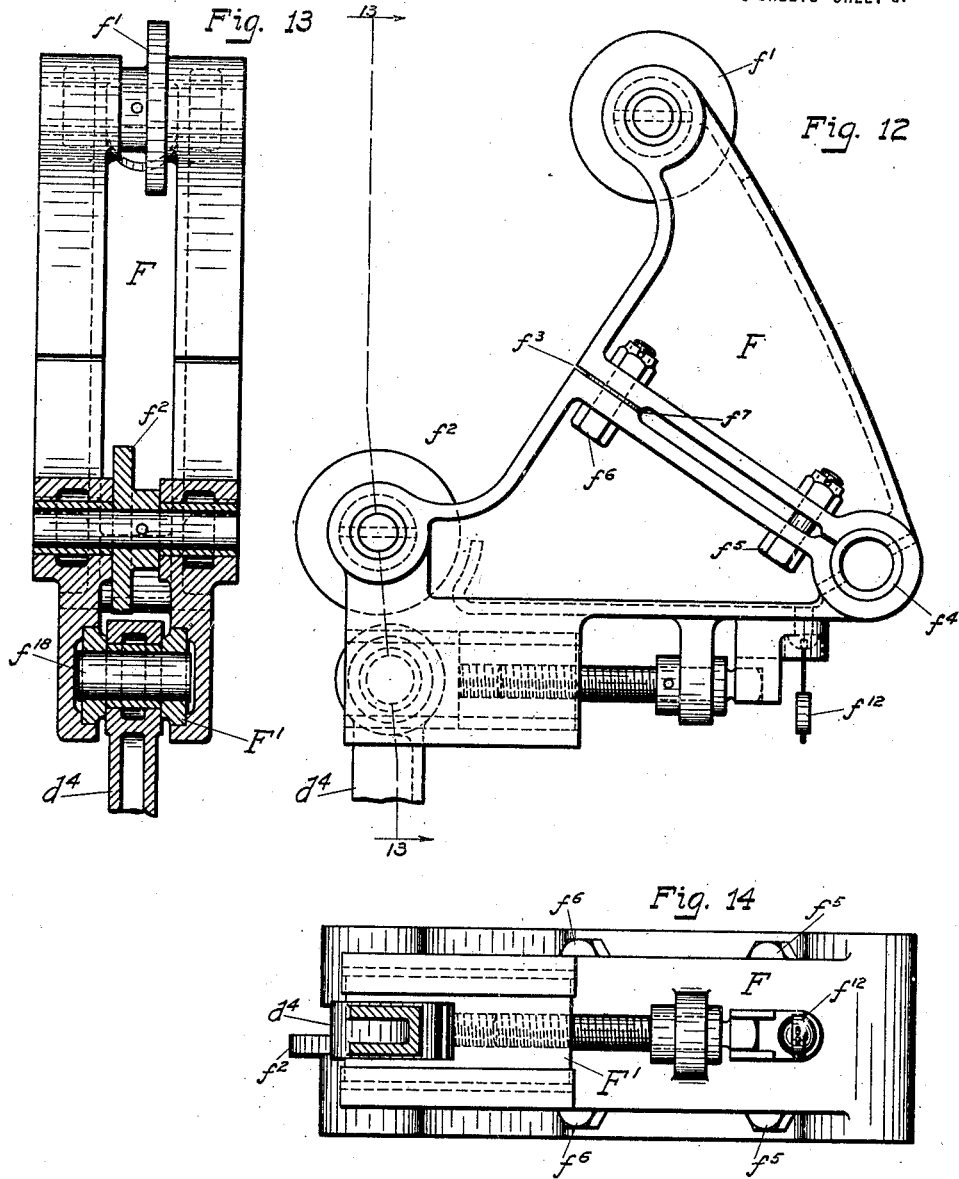

LINNAEUS E. BAKER, OF FORT WAYNE, INDIANA, ASSIGNOR TO WAYNE OIL TANK & PUMP COMPANY, OF FORT WAYNE, INDIANA, A CORPORATION OF INDIANA.

CONSTANT-FLOW MEASURING-PUMP.

1,382,451.  Specification of Letters Patent.  Patented June 21, 1921.

Application filed May 4, 1920. Serial No. 378,791.

*To all whom it may concern:*

Be it known that I, LINNAEUS E. BAKER, a citizen of the United States, residing at Fort Wayne, in the county of Allen and State of Indiana, have invented new and useful Improvements in Constant-Flow Measuring-Pumps, of which the following is a specification.

My invention relates to constant flow cam driven pumps, and particularly to means for adjusting the stroke of the pistons thereof so as to insure discharge of the required quantity of liquid at each revolution or equal fraction of a revolution of the cam shaft; so that the apparatus can be maintained as a reliable measuring pump.

My present invention constitutes an improvement on my application for patent on pumps, filed November 7, 1917, Serial No. 200714.

In the sale of gasolene and the like various governmental agencies and the demands of trade require not only a constant rate of flow of the liquid pumped but that some unit of measure shall be pumped at a stroke of the pistons, which is accomplished at a revolution of the pump crank; and to insure this under variations of manufacture and maintain it under conditions of wear the improvements over mechanism shown in the former application mentioned have been provided.

My invention is illustrated in the accompanying drawings, in which—

Figure 1, is a sectional elevation of the pump on the line 1—1 of Fig. 2, as though the apparatus was there shown in full, exposing the interior mechanism to view, Fig. 2, is a sectional elevation of the pump on the line 2—2 of Fig. 1, as though the apparatus was there shown in full, exposing the interior mechanism to view, Fig. 3, is an enlarged detail of one of the oscillating frames shown in Figs. 1 and 2, with attached means in preferred form for adjusting the stroke of a piston, Fig. 4, is a section on the line 4—4 of Fig. 3, Fig. 5, is a bottom plan view of Fig. 3, Fig. 6, an enlarged detail, is a modification of the structure shown in Fig. 3, showing a first alternative form of stroke adjustment means, Fig. 7, is a section on the line 7—7 of Fig. 6, Fig. 8, is a section on the line 8—8 of Fig. 6, Fig. 9, an enlarged detail is a second alternative form of stroke adjustment means, Fig. 10, is a section on the line 10—10 of Fig. 9, Fig. 11, is a section on the line 11—11 of Fig. 9, Fig. 12, an enlarged detail, is a third alternative form of stroke adjustment means, Fig. 13, is a section on the line 13—13 of Fig. 12, and Fig. 14, is a bottom plan view of Fig. 12.

Referring now to the drawings, the apparatus consists of pistons $d$, with check valves $d^1$, working in parallel in the cylinders D. In the single chambered bottom cylinder head C, which is connected to the inlet pipe I, are check valves H. These cylinders are preferably formed in a single casting and are shown with non-corrosive linings $D^1$.

The upper ends of the cylinders open into a common chamber B, from which the liquid pumped is discharged through the faucet J.

The piston-rods $d^3$, pass through stuffing boxes $b^1$, and are secured to the cross-heads K, which work in the guides $A^1$, preferably formed integral with the casing A. The cylinders and casing are held together by cap-screws or bolts.

The driving mechanism consists of a cam shaft E, journaled in the casing A, and provided with a crank $e$, or other means for rotating the shaft; two similar cams $e^1$, one for each piston fixed to shaft E; and two oscillating frames F, one for each cam, secured to the casing by pivots $f$, each frame having a load roll $f^1$, and a slack or return roll $f^2$, journaled in it. Each cam has two principal bearing surfaces or tracks, track $e^2$, for the load roll $f^1$, and track $e^3$, for the slack roll $f^2$. These two cams are set on the shaft E, with the corresponding high and low points of their similar cam tracks 180° apart.

The oscillating frames F, are of a generally triangular shape, and may be considered as pivoted at the apex, with one of the cam rolls journaled near each of its base angles. These oscillating frames are shown made of one piece, bifurcated by slots $f^3$. The pivot $f$, is provided with a bushing $f^4$, which is clamped in position by bolts $f^5$. The distance between cam rolls $f^1$, and $f^2$, is adjusted by means of bolts $f^6$, and shims $f^7$, to allow for variation in manufacture and for wear.

At a point below the slack roll $f^2$, on the oscillating frame F, is secured by adjustable pivot $f^8$, a connecting rod $d^4$, which is secured to the cross-head K, by pivot $d^5$.

Four sets of means are shown for altering the distance between the pivot $f$ which secures the oscillating frame F to the casing and the pivot $f^8$, $f^{18}$, which secures the connecting rod to the oscillating frame. As the angle of oscillation of the frame F, is always the same the greater the distance between these two pivots the greater will be the stroke of the piston. In the Figs. 1, 2, 3, 4, 5, 6, 7, and 8, pivot $f^8$, is eccentrically mounted in the oscillating frame F, so that by rotating it the distance between pivots $f^8$ and $f$, may be increased or diminished, and is secured against accidental rotation in Figs. 1, 2, 3, 4 and 5 by saw-slots $f^9$, bolts $f^{10}$, and seal-plate $f^{11}$, and seal $f^{12}$.

In Figs. 6, 7 and 8 the distance between pivots is also increased or diminished by rotating the pivot $f^8$, but a different method is shown of securing the eccentric pivot $f^8$, against undesired rotation. Here the pivot carries a lateral extension $f^{13}$, with holes $f^{14}$, adapted to register with other holes $f^{15}$, arranged on an arc in an extension $f^{16}$, of the oscillating frame F. A pin $f^{17}$, is adapted to pass through any of the holes $f^{14}$, and $f^{15}$, and be sealed in position.

In Figs. 9, 10 and 11 the plain pivot $f^{18}$, which takes the place of the eccentric pivot $f^8$, is mounted in a slidably adjustable block $F^1$, the adjustment of which increases or diminishes the distance between $f$ and $f^{18}$. By means of a pin $f^{19}$, with seal, and a series of holes $f^{20}$, in the block $F^1$, consecutively registering with holes $f^{21}$, in the frame F, the block $F^1$, may be adjusted and the stroke altered. Different spacings of the holes $f^{20}$, and $f^{21}$, and the holes $f^{14}$, and $f^{15}$, permit a wide range of adjustment. A set-screw $f^{22}$, is provided to clamp the block in set position.

In Figs. 12, 13 and 14 the slidably adjustable block $F^1$, is set in the desired position when increasing or diminishing the distance between pivots $f$ and $f^{18}$ by means of a screw and nut and when set adapted to be secured by a seal.

I claim as my invention and desire to secure by Letters Patent of the United States:

1. In a two piston reciprocating measuring pump of the constant flow type, oscillating frames for driving the pistons, said frames provided with means for adjustably connecting the pistons thereto at varying distances from the centers of oscillation.

2. In a two piston reciprocating measuring pump of the constant flow type, two oscillating frames pivoted to the pump housing, a rotatable cam for each oscillating frame and means for adjustably connecting the piston to each frame at varying distances from the center of oscillation.

3. In a two piston reciprocating measuring pump of the constant flow type, in combination with a pair of oscillating frames for driving the pistons, a cam-shaft, a pair of cams thereon in operative relation with said frames each cam having separate tracks for imparting motions to its oscillating frame and thereby to its piston for each direction of movement, and means for adjustably connecting the pistons to the oscillating frames at varying distances from the centers of oscillation.

4. In a constant flow pump the combination of two independent pumping cylinders arranged side by side, each having a reciprocating piston, and an oscillating frame for driving the same; adjustable connections between each piston and its oscillating frame; a single cam-shaft extending through both oscillating frames; a cam for each frame mounted on said shaft; and rolls on said frames adapted to ride suitable tracks for the ultimate operation of the reciprocating pistons.

5. In a two-cylinder cam-driven pump of the constant flow type, a cam-shaft, two cams thereon each provided with separate tracks; two oscillating piston-driving frames each provided with rolls, one suitably disposed to engage the cam track for the load movement and the other for the cam track for the slack movement of said pistons in their due operation, and means for adjustably connecting the pistons to the frames at varying distances from the centers of oscillation.

In testimony whereof I have hereunto set my hand in presence of two subscribing witnesses.

LINNAEUS E. BAKER.

Witnesses:
LAWRENCE PARROT,
JOHN R. WEMHOFF.